(12) United States Patent
Bastiaans

(10) Patent No.: US 7,802,948 B1
(45) Date of Patent: Sep. 28, 2010

(54) DRILL EXTENDER

(76) Inventor: Matthew R Bastiaans, 22552 Seaver Ct., Saugus, CA (US) 91350

( * ) Notice: Subject to any disclaimer, the term of this patent is extended or adjusted under 35 U.S.C. 154(b) by 1056 days.

(21) Appl. No.: 11/422,816

(22) Filed: Jun. 7, 2006

(51) Int. Cl.
*B23B 31/06* (2006.01)
*B23B 51/12* (2006.01)

(52) U.S. Cl. .......... 408/239 R; 408/233; 408/1 R; 279/8; 279/83; 279/105.1; 279/143

(58) Field of Classification Search .......... 408/233, 408/238, 239 R; 279/8, 83, 143–145, 105.1; 81/177.2; *B23B 31/06, 51/12*
See application file for complete search history.

(56) References Cited

U.S. PATENT DOCUMENTS

| | | | | | |
|---|---|---|---|---|---|
| 1,376,139 | A | * | 4/1921 | Del Porto | 403/104 |
| 1,758,069 | A | * | 5/1930 | Abramson | 279/90 |
| 2,263,579 | A | * | 11/1941 | Hokanson | 403/20 |
| 2,675,570 | A | * | 4/1954 | Sacks | 15/104.095 |
| 2,716,030 | A | * | 8/1955 | Faso | 279/105.1 |
| 2,721,592 | A | * | 10/1955 | Baker | 408/206 |
| 2,838,283 | A | * | 6/1958 | Simmonds et al. | 175/203 |
| 2,848,240 | A | * | 8/1958 | Nicol | 279/89 |
| 3,011,369 | A | * | 12/1961 | Russell | 408/80 |
| 3,138,183 | A | * | 6/1964 | Stewart | 408/206 |
| 3,146,813 | A | * | 9/1964 | Dirksen | 408/206 |
| 3,267,975 | A | * | 8/1966 | Enders | 408/200 |
| 3,474,838 | A | * | 10/1969 | Schmitt | 408/214 |
| 3,529,497 | A | * | 9/1970 | Brooks | 81/463 |
| 3,647,310 | A | * | 3/1972 | Morse | 408/239 R |
| 3,661,473 | A | * | 5/1972 | Kubicek | 408/239 R |
| 3,706,505 | A | * | 12/1972 | Stougaard | 408/78 |
| 3,774,556 | A | * | 11/1973 | Poll | 111/7.2 |
| 3,825,362 | A | * | 7/1974 | Hougen | 408/68 |
| 3,837,759 | A | * | 9/1974 | Bittern | 408/204 |
| 4,017,202 | A | * | 4/1977 | Townsend | 408/226 |
| 4,036,560 | A | * | 7/1977 | Clark et al. | 408/204 |
| 4,076,444 | A | * | 2/1978 | Siebrecht | 408/226 |
| 4,148,593 | A | * | 4/1979 | Clark | 408/204 |
| RE30,071 | E | * | 8/1979 | Hilding et al. | 175/52 |
| 4,332,160 | A | * | 6/1982 | Baragar et al. | 73/84 |
| 4,386,882 | A | * | 6/1983 | Bereiter | 411/387.1 |
| 4,669,928 | A | * | 6/1987 | Mediavilla | 408/68 |
| 4,755,087 | A | * | 7/1988 | Parent | 408/68 |
| 4,766,783 | A | * | 8/1988 | Stanich et al. | 81/54 |
| 4,831,902 | A | * | 5/1989 | McClure | 81/53.2 |
| 4,968,189 | A | * | 11/1990 | Pidgeon | 408/1 R |
| 5,076,741 | A | * | 12/1991 | Littlehorn | 408/68 |
| 5,082,403 | A | * | 1/1992 | Sutton et al. | 408/68 |

(Continued)

*Primary Examiner*—Eric A Gates
(74) *Attorney, Agent, or Firm*—Law Office Gary Schnittgrund; Gary Schnittgrund

(57) ABSTRACT

The invention is a drill bit extender and method that enables holes to be formed or screws to be driven remote from a drill motor. It includes a drill adapter for attaching to a drill bit, hole saw, or spade bit, for example. The drill adapter accepts a threaded rod, such as a segment of rod that is threaded along its entire length, where the length of the rod determines the distance that a hole can be drilled remote from a drill motor. The rod is readily attachable and replaceable to enable an operator flexibility in drilling at various locations remote to a drill motor. The rod is attached to a drill motor by a drill motor adapter, which securely retains the rod in the drill motor adapter, enabling the drill motor to drive the remotely located drill bit efficiently.

16 Claims, 2 Drawing Sheets

U.S. PATENT DOCUMENTS

| | | | |
|---|---|---|---|
| 5,108,235 A * | 4/1992 | Czyzewski | 408/204 |
| 5,154,552 A * | 10/1992 | Koetsch | 408/204 |
| 5,226,762 A * | 7/1993 | Ecker | 408/204 |
| 5,352,071 A * | 10/1994 | Cochran et al. | 408/204 |
| 5,435,672 A * | 7/1995 | Hall et al. | 408/68 |
| 5,658,102 A * | 8/1997 | Gale | 408/1 R |
| 5,813,802 A * | 9/1998 | Ajimi et al. | 408/68 |
| 6,065,909 A * | 5/2000 | Cook | 408/206 |
| 6,120,221 A * | 9/2000 | Alm | 408/204 |
| 6,171,033 B1 * | 1/2001 | Wrobel | 408/239 R |
| 6,341,925 B1 * | 1/2002 | Despres | 408/204 |
| 6,357,973 B2 * | 3/2002 | Chao | 408/204 |
| 6,588,993 B2 * | 7/2003 | Omi | 408/226 |
| 6,623,220 B2 * | 9/2003 | Nuss et al. | 408/204 |
| 6,641,338 B2 * | 11/2003 | Despres | 408/204 |
| 6,681,875 B2 * | 1/2004 | Larsson et al. | 175/320 |
| 6,736,226 B2 * | 5/2004 | Broom | 175/320 |
| 6,964,547 B2 * | 11/2005 | Stojanovski | 409/233 |
| 6,971,825 B2 * | 12/2005 | Stojanovski | 409/233 |
| 7,073,992 B2 * | 7/2006 | Korb et al. | 408/204 |
| 7,101,124 B2 * | 9/2006 | Keightley | 408/204 |
| 7,462,004 B2 * | 12/2008 | Kopp | 408/137 |
| 2002/0021945 A1 * | 2/2002 | Harpaz et al. | 407/53 |
| 2002/0037201 A1 * | 3/2002 | Despres | 408/204 |
| 2002/0050362 A1 * | 5/2002 | Larsson et al. | 166/380 |
| 2002/0121392 A1 * | 9/2002 | Broom | 175/320 |
| 2002/0127070 A1 * | 9/2002 | Mawhinney | 408/139 |
| 2004/0161313 A1 * | 8/2004 | Nordlin | 408/204 |
| 2004/0173059 A1 * | 9/2004 | Klein et al. | 81/177.2 |
| 2004/0179911 A1 * | 9/2004 | Keightlev | 408/204 |
| 2004/0191015 A1 * | 9/2004 | Kozak | 408/67 |
| 2005/0025592 A1 * | 2/2005 | Cantlon | 408/204 |
| 2005/0097689 A1 * | 5/2005 | Harr | 15/104.16 |
| 2005/0163585 A1 * | 7/2005 | Bodin et al. | 411/31 |
| 2006/0196321 A1 * | 9/2006 | Carroll | 81/177.2 |
| 2006/0263155 A1 * | 11/2006 | Kopp | 408/137 |
| 2007/0071565 A1 * | 3/2007 | Singh et al. | 408/204 |
| 2008/0118315 A1 * | 5/2008 | Brunson | 408/204 |

* cited by examiner

DRILL EXTENDER

OBJECTS OF THE INVENTION

It is an object of the invention to enable hole drilling or screwing remote from a drill motor.

It is an object of the invention to provide an apparatus to enable hole drilling remote from a drill motor.

Other objects, advantages and novel features of the present invention will become apparent from the following detailed description of the invention when considered in conjunction with the accompanying drawing

DETAILED DESCRIPTION OF THE INVENTION

Figure 1:
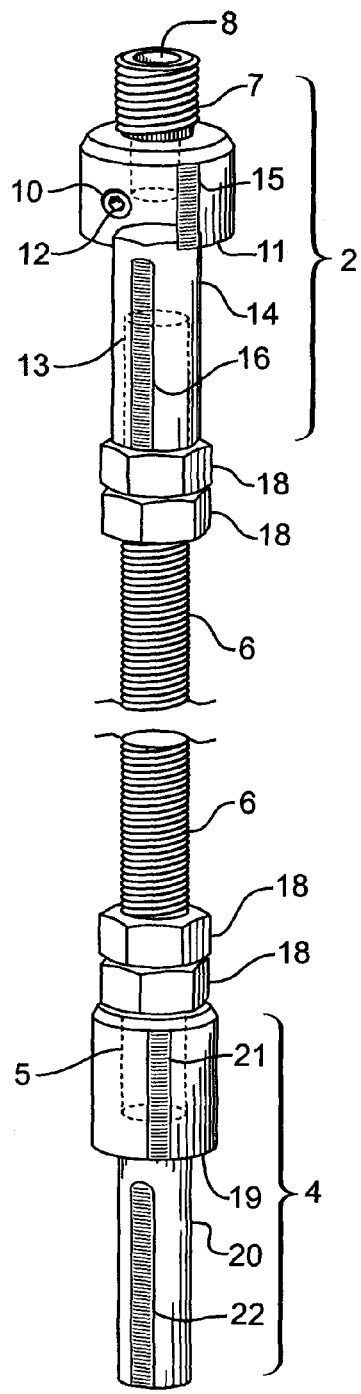
FIG. 1 illustrates a perspective view of a drill adapter and drill motor adapter assembly with threaded rod.
Figure 2:
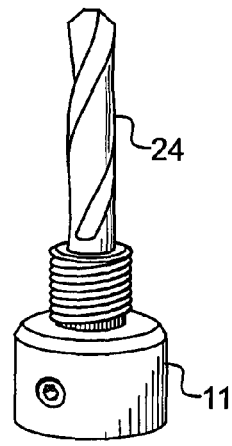
FIG. 2 depicts a perspective view of a drill adapter with an installed drill bit according to an embodiment of the present invention.
Figure 3:
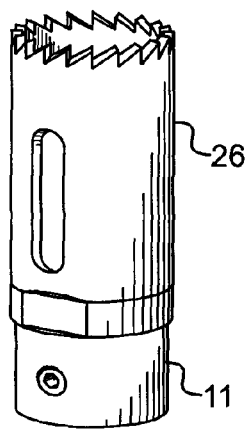
FIG. 3 depicts a perspective view of a drill adapter with an installed hole saw according to an embodiment of the present invention.

Electricians, plumbers, construction workers, and home remodelers frequently are faced with the problem of drilling a hole at an inaccessible location that is some distance from the drill motor. A drill extension system apparatus and method of drilling holes remotely from the drill motor is disclosed, FIG. 1, which employs a drill adapter 2 comprising a longitudinal axis centered externally threaded shaft 7 having a centered internal bore 8. Optionally, a screw tip can replace a drill bit to drive a remotely located screw. Holes in wood or metal may be drilled with the invention by selecting the correct drill bit. The internal bore 8 is sized to accept a conventional drill bit 24, which in a preferred embodiment is 0.25 inches in diameter.

The drill bit 24 is retained in the drill adapter 2 and is prevented from rotating within the internal bore 8 of drill adapter 2 by means of a set screw 12 that is threadably tightened in threaded hole 10 to fixedly contact the drill bit 24. The internal bore 8 extends into a cylindrical stock 11.

The drill adapter 2 further comprises an axially-centered hollow adapter shaft 14 wherein the hollow adapter shaft 14 comprises a hole 13 that is threaded internally to accept a threaded rod 6. The threaded rod 6 is threaded along its entire length, in a preferred embodiment. This enables a user to utilize this invention by procuring what is commonly called "all thread" threaded rod 6, which is often readily available to electricians and constructions workers at their work sites, and to cut it to the desired length, which may be any length, and typically might be a few inches to several feet in length. It will be clear to one skilled in the art that the threaded rod 6 may, in an alternative embodiment, be threaded only on its ends.

Figure 5:
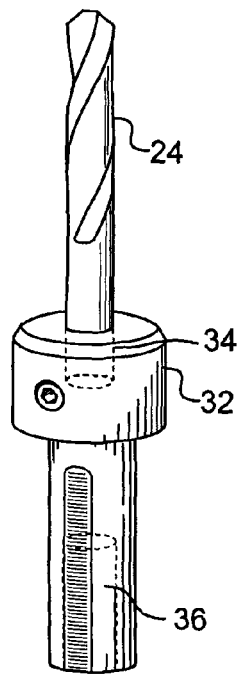
FIG. 5 depicts a perspective view of a drill adapter that has no threaded shaft with an installed drill bit according to an embodiment of the present invention.

As discussed above, the drill adapter 2 comprises an externally threaded shaft 7 having a centered internal bore 8. The externally threaded shaft 7 is present in a preferred embodiment as presented in FIG. 1, however, the threaded shaft 7 may be removed, as presented in the alternative embodiment of FIG. 5. In this embodiment, a drill bit 24 is placed directly into a cylindrical stock 32 portion of a drill adapter 32 into hole 34, where it is fixedly retained by a set screw 10, as previously discussed.

In the embodiment as presented in FIG. 1 a hole saw 26 may be threadably positioned on threaded shaft 7. It has been discovered that it is advantageous to place the hole saw 26 and the drill bit 24 on the drill adapter 2 together [not illustrated] so that the drill bit 24 extends slightly father from the drill adapter 2 than the hole saw 26, thereby allowing a pilot hole to be drilled by drill bit 24 before hole say 26 engages and begins forming a hole in the surface to be drilled.

Figure 4:
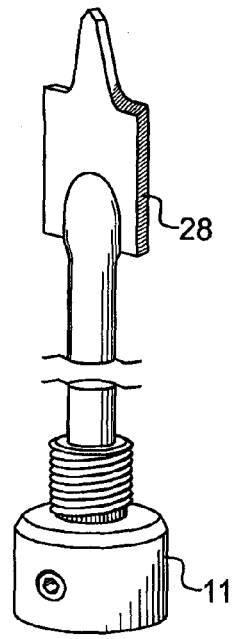
FIG. 4 depicts a perspective view of a drill adapter with an installed spade bit according to an embodiment of the present invention.

Alternatively, a spade drill bit 28, as illustrated in FIG. 4, may be placed in the internal bore 8 of the threaded shaft 7 to enable a hole to be drilled of a size that is determined by the diameter of the rotating spade drill bit 28. As discussed previously, a set screw 12 retains the spade drill bit 28 in position.

The drill adapter 2 and threaded rod 6 are adaptably engaged with a drill motor [which is not illustrated] by drill motor adapter 4, FIG. 1. The threaded rod 6 threadably engages the drill motor adapter by screwing into an axially located threaded bore 5 in drill adapter 2.

The drill motor adapter 4 engages a drill motor, which typically has a chuck suitable to securely grasp a drill bit shaft with a diameter up to about 0.5 inches, by means of adapter shaft 20, which in a preferred embodiment is about 0.375 inches in diameter.

To enable assembly and disassembly of the apparatus, the hollow adapter shaft 14 is presented as an alternate embodiment with at least two flat surfaces 16 and preferably with three flat surfaces 16 that are located symmetrically around adapter shaft 14. These flat surfaces 16 enable secure grasping of the drill adapter 2 with pliers or wrench, for example, or in a preferred embodiment they provide for secure gripping by a drill chuck on a drill motor. Optionally, two wrench flats 15 are located on stock 11 to enable gripping with a wrench or pliers during assembly or disassembly.

Similarly, the drill motor adapter has at least two and preferably three flat surfaces 22 symmetrically located around adapter shaft 20 to facilitate assembly and disassembly of the apparatus or, in a preferred embodiment, to enable gripping by a drill chuck. In an alternative embodiment, boss 19 has two wrench flats 21 for gripping by wrench or pliers during assembly or disassembly.

While the assembly of FIG. 1 is rotating in a clockwise direction, that is, while a hole is being drilled, the drill motor adapter 4 and the drill adapter 2 are being urged to more tightly engage the threaded rod 6, where the threads are all conventional right-handed. However, when the assembly is being removed from a work area, it is common that the drill motor would be run in reverse, thereby risking loosening of the threaded assembly and potentially loss of the drill adapter 2, for example. It has been demonstrated that placing two pair of securing nuts 18, one pair on either end of the threaded rod 6, and tightening them to engage the drill adapter 2 and separately the drill motor adapter 4, allows the drill extension system assembly to remain intact even as it is removed and rotated in the direction that would cause disassembly from the threaded rod 6. The nuts 18 can be hex nuts, square nuts, etc. as would obvious to a person skilled in the art. It is known to the inventor that other means of attaching the threaded rod 6 to the drill adapter 2 or the drill motor adapter 4 are available, such as cotter pins, quick disconnects, and bayonet mounts, for example.

Figure 6:
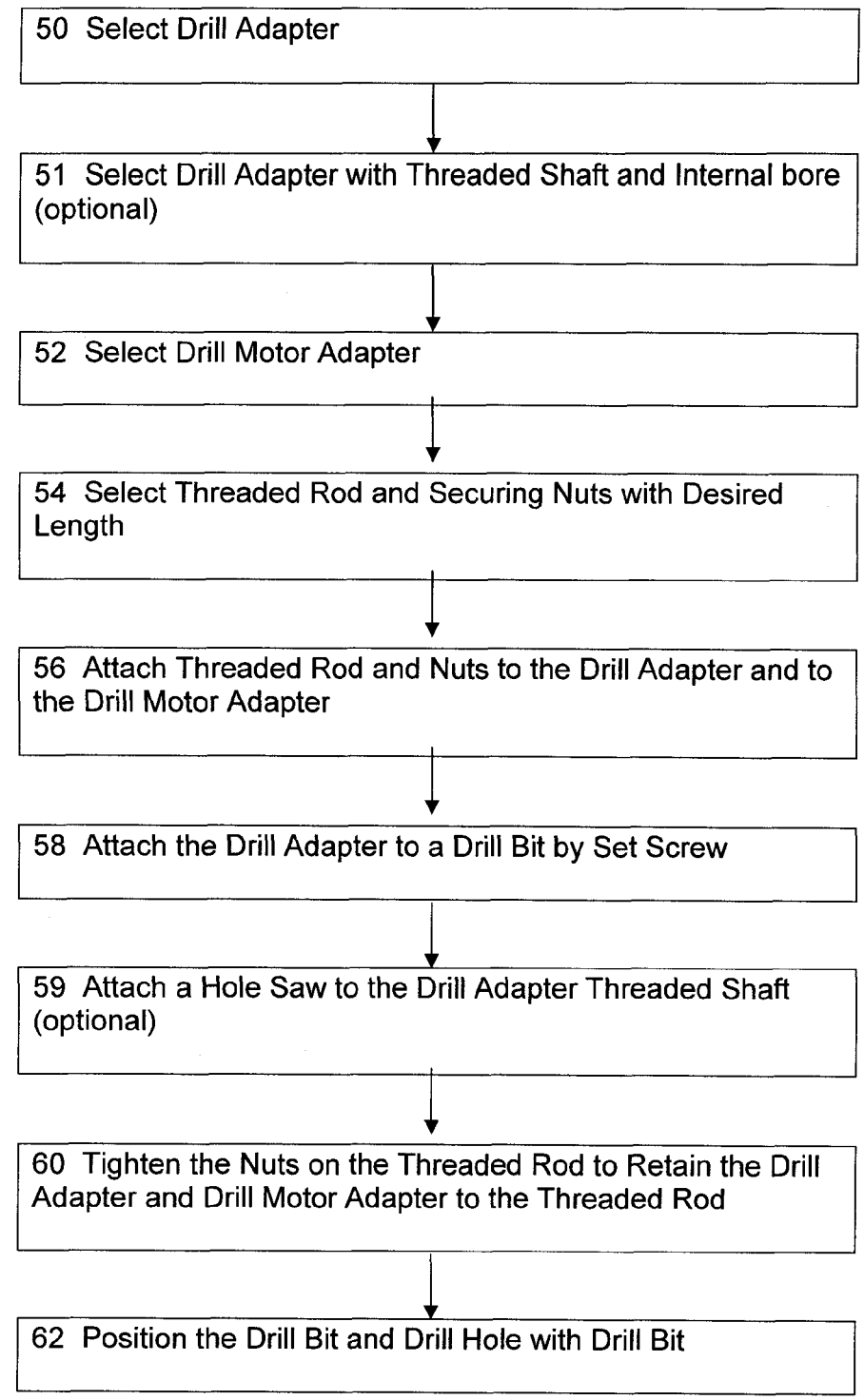
FIG. 6 presents the process steps for the method of drilling a hole remotely.

The method of remotely drilling a hole with the drill extension system, FIG. 1, comprises the following:

A first step 50 in the method, FIG. 6, is to select a drill adapter 2, 32 and to select a drill motor adapter 4, step 52. In one embodiment, the drill adapter 2 has a threaded shaft 5 having an internal bore 8 that is adapted to allow a drill bit 24 or a spade drill bit 28 to fit therein. Alternately, the drill adapter 32, FIG. 5, accepts the drill bit directly into a hole 34. The drill bit is secured with a set screw 12, step 58. Drill Adapter 32 has an internally threaded hole 36 to allow threadably engagement with threaded rod 6.

A next step 54 is to select a threaded rod 6, of a desired length for remote hole placement, which engages with internal threads in hollow adapter shaft 14 of the drill adapter 2 and with the drill motor adapter 4 internally threaded hole 5, step 56. Two pair of securing nuts 18 that are located on either end of the threaded rod 6 are tightened to securely retain the assembly as a fixed unit, step 60.

Optionally, step 51, the drill adapter 2 is selected with a threaded shaft 7 and an internal bore 8, where the internal bore accepts a drill bit. In step 59 a hole saw 26 is threadably engaged with threaded shaft 7 on drill adapter 2.

Lastly, in step 62, the drill extension system, including a drill bit, is positioned to drill a hole. After drilling, the system is removed.

Obviously, many modifications and variations of the present invention are possible in light of the above teachings. It is therefore to be understood that, within the scope of the appended claims, the invention may be practiced otherwise than as specifically described.

What is claimed is:

1. A drill adapter to enable remote drilling operation, comprising:
    a cylindrical stock defining an internal bore adapted to retain a drill bit shaft;
    a hollow adapter shaft adapted to engage one end of a threaded rod;
    said threaded rod selected from a plurality of desired length rods to enable the remote drilling operation;
    wherein said threaded rod is fixedly retained in said hollow adapter shaft by securing nuts; and
    wherein said cylindrical stock includes two opposing wrench flats to facilitate gripping by wrench.

2. The drill adapter according to claim 1, wherein said hollow adapter shaft has an outside surface and at least three flats on the outside surface to facilitate gripping by a drill motor chuck.

3. The drill adapter according to claim 1, further comprising a set screw to retain a drill bit in said stock.

4. The drill adapter according to claim 1, wherein said drill adapter further comprises an externally threaded shaft adapted to mate with a hole saw and having an internal bore to accept a drill bit.

5. A drill extension system to enable remote drilling operation, comprising:
    a drill adapter including a stock defining an internal bore to retain a drill bit;
    a hollow adapter shaft adapted to threadably engage a threaded rod;
    said threaded rod selected from a plurality of desired length rods to enable the remote drilling operation;
    a drill motor adapter comprising a drill motor adapter shaft that engages a drill motor chuck and a boss that engages said threaded rod;
    said threaded rod is fixedly retained in said hollow adapter shaft by securing nuts; and
    wherein said drill motor adapter boss has an internally threaded bore to engage said threaded rod.

6. The drill extension system according to claim 5, wherein said drill adapter further comprises a threaded shaft having an internal bore that is adapted to threadably engage a hole saw.

7. The drill extension system according to claim 5, wherein said hollow adapter shaft comprises three flat surfaces to facilitate gripping by a drill motor chuck.

8. The drill extension according to claim 5, wherein said boss includes at least two opposing flat surfaces to facilitate gripping by a wrench during installation of said threaded rod.

9. The drill extension system according to claim 5, further comprising a set screw to retain a drill bit in said stock.

10. The drill extension according to claim 5, wherein said threaded rod has two ends each of which is threaded.

11. The drill extension according to claim 5, wherein said drill motor adapter threadably engages said threaded rod.

12. The drill extension according to claim 5, wherein said drill motor adapter comprises a drill motor adapter shaft.

13. The drill extension according to claim 12, wherein said drill motor adapter shaft comprises at least three flat surfaces to facilitate gripping by a drill motor chuck.

14. A method of drilling a hole remotely, comprising the steps of:
    selecting a drill adapter;
    selecting a drill motor adapter;
    selecting a threaded rod having a length suitable to remotely drilling a hole and securing nuts that engage said threaded rod;
    threadably engaging said threaded rod comprising securing nuts to said drill adapter and to said drill motor adapter;
    attaching said drill adapter to a drill bit by means of a set screw; and
    tightening said securing nuts on said threaded rod to removably retain said drill adapter and said drill motor adapter to said threaded rod; and
    positioning the drill bit and drilling a hole with the attached drill bit.

15. The method according to claim 14, further comprising selecting said drill adapter having a threaded shaft with internal bore to accept said drill bit.

16. The method according to claim 15, further comprising threadably attaching a hole saw to said drill adapter threaded shaft.

* * * * *